UNITED STATES PATENT OFFICE.

DAVID L. McKITRICK, OF BATON ROUGE, LOUISIANA.

LUBRICATING COMPOSITION.

SPECIFICATION forming part of Letters Patent No. 378,331, dated February 21, 1888.

Application filed March 26, 1887. Serial No. 232,572. (Specimens.)

*To all whom it may concern:*

Be it known that I, DAVID L. McKITRICK, of Baton Rouge, in the parish of East Baton Rouge and State of Louisiana, have invented certain new and useful Improvements in Lubricating Compounds; and I do hereby declare that the following is a full, clear, and exact description of the invention, which will enable others skilled in the art to which it appertains to make and use the same.

My invention relates to packing designed for use particularly in the journal-boxes of railway-cars, the object being to provide a packing that will thoroughly lubricate the journal of a car, and one that will be incombustible and durable.

I manufacture my improved packing out of the following ingredients and in about the proportions specified, viz: crude asbestus, one pound; powdered plumbago, two ounces; powdered soapstone, one ounce; powdered borax, one pound; common lard-oil, three quarts. These ingredients are to be thoroughly mixed together, and the compound thus formed is to be used as a packing in the journal-box, taking the place of the common waste that is generally used. When this packing is in the journal-box, it is thoroughly saturated with a lubricating-oil. As much of this lubricating-oil is poured over the packing as the journal-box will contain.

The above-described packing has very great non-conducting properties, thereby preventing the heating of the boxes. It also absorbs the lubricating-oil so completely that lubrication is liberally and uniformly supplied, while at the same time its capillary attraction for oil allows the oil to be used only as needed, thus preventing the great waste which occurs with the packing commonly used.

Another valuable feature of this packing is its durability. After it has been used a certain length of time, it may be taken from the journal-boxes, and by subjecting it to a temperature that will make it red-hot all the dirt and grease will be burned out of it. It can then be mixed with fresh oil and be again used to pack the journal-boxes.

The function of the borax is to prevent the flaming of the oil, and for this purpose I have found it very valuable.

Having thus fully described my invention, what I claim is—

The herein-described composition to be used as packing for journal-boxes, which consists of crude asbestus, powdered plumbago, powdered soapstone, powdered borax, and lard-oil, when the same are thoroughly mixed and combined in substantially the proportions specified.

In testimony that I claim the foregoing as my own I affix my signature in presence of two witnesses.

DAVID L. McKITRICK.

Witnesses:
JOSHUA BECK,
I. SIMON.